United States Patent [19]
Karl

[11] 4,315,408
[45] Feb. 16, 1982

[54] OFFSHORE LIQUIFIED GAS TRANSFER SYSTEM

[75] Inventor: Robert D. Karl, Pacific Palisades, Calif.

[73] Assignee: Amtel, Inc., Providence, R.I.

[21] Appl. No.: 217,850

[22] Filed: Dec. 18, 1980

[51] Int. Cl.$^3$ ............................................... F17C 7/02
[52] U.S. Cl. ............................................... 62/55; 9/8 P; 138/107; 138/112; 138/114; 141/388; 405/203
[58] Field of Search ................... 62/55; 138/112, 114, 138/106, 107; 9/8 P; 141/387, 388; 405/203

[56] References Cited

U.S. PATENT DOCUMENTS

| | | | |
|---|---|---|---|
| 2,348,478 | 5/1944 | Jones | 62/55 |
| 3,379,027 | 4/1968 | Mowell et al. | 62/55 |
| 3,663,644 | 5/1972 | Harvey | 62/55 |
| 3,699,775 | 10/1972 | Cowans | 62/55 |
| 3,706,208 | 12/1972 | Kadi et al. | 62/55 |
| 3,969,781 | 7/1976 | Reid, Jr. | 9/8 P |
| 3,979,785 | 9/1976 | Flory | 9/8 P |

*Primary Examiner*—Ronald C. Capossela
*Attorney, Agent, or Firm*—Freilich, Hornbaker, Wasserman, Rosen & Fernandez

[57] ABSTRACT

A hose assembly is described for use in the transference of cooled liquified gas to a vessel, in a system that requires the flexible hose to lie in the water. The hose assembly includes a flexible inner hose forming a central passage through which liquified gas can pass towards the vessel and having walls that are permeable to the bleeding of vapor therethrough, to avoid damage by expanding liquid droplets that find their way into the inner hose wall. The assembly also includes an outer hose with substantially impermeable walls, the outer hose surrounding the inner hose and leaving an annular passage between them which can receive the vapor permeating the inner hose. The annular passage also can be used to carry vapor from the vessel back to a shore-based installation which reliquifies it.

11 Claims, 6 Drawing Figures ic gas transfer system

BACKGROUND OF THE INVENTION

Hydrocarbons can be transferred from a pipeline at the sea floor to a vessel by transfer systems such as the CALM (catenary anchor leg mooring) type which includes a buoy anchored by several chains and tied by a hawser to the vessel. A flexible hose can extend up from the sea floor pipeline to the buoy, and another flexible hose can extend from a fluid swivel on the buoy and along the water to the vessel. Such an installation could be utilized to transfer cooled liquified gas, except that it is difficult to construct a reliable flexible hose that can lie in the water and carry such a product.

LPG (liquified petroleum gas) can be cooled to a temperature such as −45° C. to reduce its volume to perhaps 1/400th its volume as a gas at atmospheric pressure. Actually, LPG is liquid at −43° C. and atmospheric pressure, and at 154 psi and ambient temperature. A flexible hose which has been used on land to carry LPG includes walls formed of multiple layers of rubber and steel wire, and also includes microscopic passages extending through part of the wall thickness to enable the bleeding out of vapor. It has been found that when LPG is pumped through the hose, small droplets of the liquid penetrate into the walls of the hose, into minute cracks and the like. Such penetration occurs because typical LPG has a very low surface tension which enables it to penetrate deeply into capillary tube-like passages. When the small droplets later expand, especially when the flow of LPG stops and the temperature of the hose rises, the volume of the droplets expands many times as it vaporizes. For example, at a pressure of perhaps 100 psi at which LPG may be pumped, the vapor has a volume about 60 times that of the liquid, and at atmospheric pressure has a volume of about 400 times as great. Without the presence of microscopic passages to permit the rapid bleeding out of the vapor, the vapor bubbles form blisters in the hose, which weakens it and eventually requires hose replacement.

While the bleedable hose can be used to carry LPG on land where the hose is surrounded by air, difficulties can arise if such a hose is used in water. When the above-described flexible hose is utilized in water, then water may enter the outer ends of the bleed passages when the hose does not carry LPG. When LPG again flows through the hose and it cools, the water in the bleed passages freezes, and in freezing expands and becomes tightly locked in place. The bleed passages are blocked, and cannot vent the vapor. A flexible hose which could lie in the water and carry LPG without damage to the hose by interaction with the water, would be of great value in the transportation of LPG as to a vessel moored offshore.

SUMMARY OF THE INVENTION

In accordance with one embodiment of the present invention, a system is provided for the transference of cooled liquified gas to a vessel, which includes a flexible hose structure that lies in the water and through which the liquified gas passes, wherein the hose structure is constructed to avoid damage thereto by the contact of water with the outside of the hose structure. The hose structure includes an inner hose forming a central passageway, and an outer hose surrounding the inner hose and having an inside diameter large enough to leave an annular passageway between the inner and outer hoses. Vapor that migrates outwardly through the walls of the inner hose, is collected in the annular passageway, from which it can be pumped out.

The hose structure can be utilized in a system for transferring LPG (liquified petroleum gas) from a liquifier of a shore based installation, to a vessel which has heat-insulated tanks for holding the LPG. An offshore transfer structure which moors the vessel, also carries a fluid swivel which connects an undersea conduit to a conduit that extends to the vessel, and both of the conduits can include a flexible hose that lies in the water. The coaxial flexible hose structure can be utilized, with the central passageway carrying the LPG towards the vessel, and with the annular passageway being utilized to carry vapor back to the shore based installation. Such vapor can include vapor released in the insulated tanks of the vessel which can be pumped through the annular passage of the hose structure, to flow along with small amounts of vapor that have bled through the inner hose walls, to a liquifier on the shore which reliquifies the gas. Thus, the hose structure can serve to isolate the permeable walls of the inner hose from the surrounding water and to gather vapor bleeding therethrough, and also can be utilized to carry large amounts of vapor that must be pumped away to the shore-based installation for liquification.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
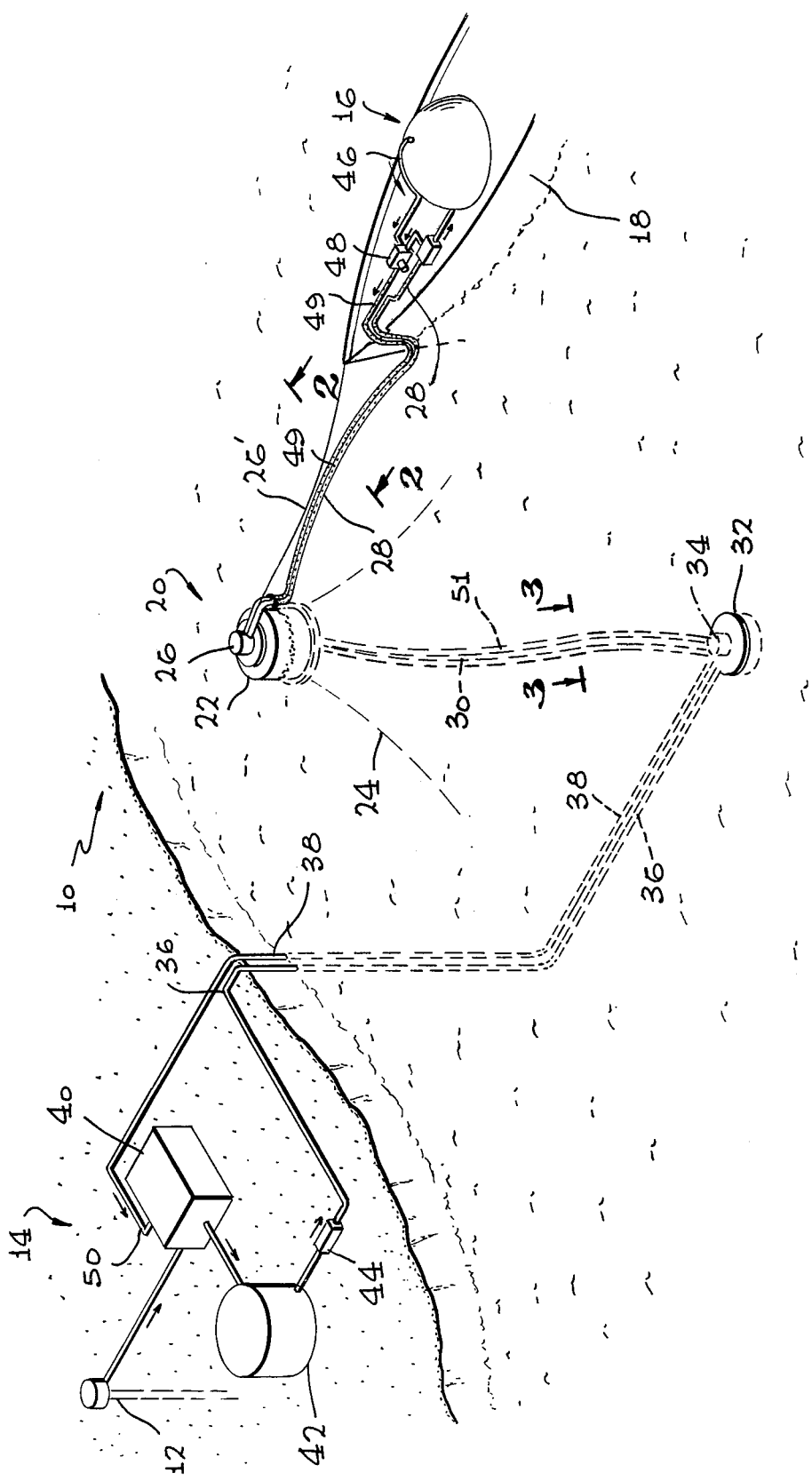
FIG. 1 is a perspective view of a system constructed in accordance with the present invention for transferring LPG (liquified petroleum gas) to a moored vessel.

FIG. 1 illustrates a system 10 for transferring LPG (liquified petroleum gas) produced from a well 12 and which is liquified at a shore-based installation 14, from the shore to heat-insulated tanks 16 on a ship 18. An offshore transfer structure 20 of the CALM (catenary anchor leg mooring) type is utilized to moor the ship or vessel and aid in the transference of LPG thereto. The transfer structure 20 includes a buoy 22 held in approximate location by a group of catenary chains 24 and connected through a hawser 26' to the vessel. The transfer structure also includes a fluid swivel 26' connected through a floating hose structure 28 to the vessel, and connected through an underbuoy hose structure 30 to a base 32 at the sea floor. The lower end of the underbuoy hose structure 30 is connected to a pair of sea floor pipelines 36, 38 to the shore based installation 14.

Gas removed from the wall 12 enters a liquifier 40 which compresses and cools the gas until it is in the form of a liquid, to thereby reduce the volume of the gas which originally might have been at atmospheric pressure, to perhaps 1/400th its original volume. The liquid is delivered to a storage tank 42, and from there to a pump 44 that pumps it into the pipeline 36. The LPG passes along the pipeline 36, up through the underbuoy hose structure 30, through the floating hose structure 28 to the vessel, and into the tank 16 on the vessel. Some of the LPG will have vaporized, and can be collected by a pipe 46 connected to the top of the tank. The vapor is pumped by a pump 48 through a floating hose 49 through an underbuoy hose 51 and through the pipeline 38 back to the shore. The vapor enters another inlet 50 of the shore-based liquifier 40, so it can be reliquified to pass along with the rest of the LPG to the vessel.

The system 10 utilizes two flexible hose structures 28, 30 that lie in the water and which must carry LPG. The LPG is cooled to a low temperature such as $-45°$ C., to maintain it in a liquid state even if the pressure is reduced to atmospheric, and is pumped so it is at a pressure (at sea level) of about 100 psi along the conduit that carries it to the vessel and which includes the pipe 36 and hose structures 28, 30. It is difficult to construct a flexible hose that can carry LPG and which will have a reasonable lifetime of use. In order to obtain flexibility, the hose is constructed of a flexible material such as rubber. However, it is found that small droplets of the pressured LPG bleed into minute cracks, pores, and other small recesses of the rubber walls of a hose. When the temperature of these droplets rises so that they turn into vapor, particularly when transference of LPG stops, the large amounts of vapor (about 60 times the volume of the droplet at 100 psi) can damage the rubber of the hose. The vapor cannot bleed out as rapidly as it is formed, so that high pressure pockets are created in the hose which can lead to the formation of blisters. The blisters weaken the hose and greatly reduce its useful lifetime.

A technique that has been utilized to avoid the formation of blisters from vaporized droplets bleeding into the hose, is the provision of bleed carriers in the hose to enable the rapid bleed-out of high pressure vapor therein. This can be accomplished by constructing the hose with an embedded fabric or with small cords or threads along which the vapor can pass. A hose of this type can utilize helically wound strips of rubber interspersed with wound steel wire, all of which are vulcanized to form a largely rubber hose body which is covered by polystyrene foam insulation. Needles can be used to penetrate partially through the hose wall and to install threads therein. Small amounts of liquid that penetrate into the rubber body, later can turn into vapor when LPG is no longer carried. This vapor can bleed out along the threads to the outside of the hose walls to avoid localized high pressure that causes blisters. While this type of hose can carry LPG on land, it may not be dependable for carrying LPG when the hose is immersed in water. Water can pass a small distance along the bleed carrier, when the hose is not carrying LPG. When the hose later carries LPG, the water in the ends of the bleed carriers may freeze and expand to tightly plug the bleed passage. The vapor cannot expand and therefore can cause blisters.

Figure 2:
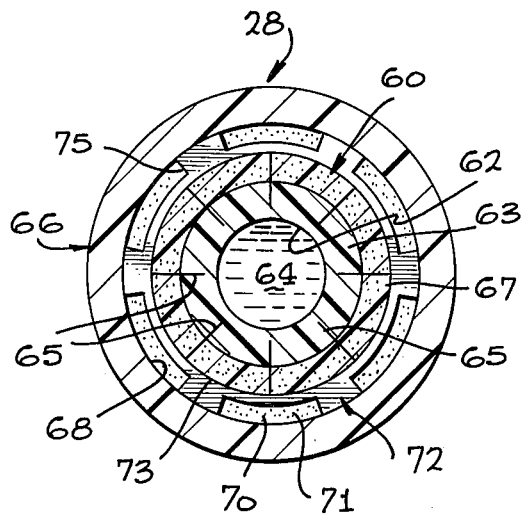
FIG. 2 is a sectional view of a hose structure of the system of FIG. 1, as taken on the line 2—2 thereof.

The present hose structure such as 28 which lies in the water and which carries LPG, has a construction such as that shown in FIG. 2. The flexible hose structure includes an inner hose 60 which forms a central passageway 62 through which LPG shown at 64 can pass in its movement towards the vessel. The inner hose 60 includes multiple strips of helically wound rubber and wire vulcanized together to form a body 63, and which may be covered by insulation 67. Bleed carriers such as threads 65 lie in the hose walls to carry away vapor arising from droplets of the LPG that have bled into the hose walls. The hose structure 30 also includes a flexible outer hose 66 which surrounds the inner hose 60, the outer hose having an inside surface 68 of larger diameter than the periphery 73 of the inner hose to leave an annular passageway 70 between them. The passageway 70 is utilized to carry vapor 71 which represents gasified LPG. A spacer structure 72 is utilized in the annular chamber 70 to space the periphery or outside 73 of the inner hose from the inside of the outer hose. The spacer structure 72 is formed by disks with slots 75, the disks being bonded to the periphery of the inner hose 60 and spaced apart by a distance such as one meter for a hose of one-half meter outside diameter.

The hose structure 30 can be utilized, by allowing the inner hose 60 to carry LPG from the liquification plant on the shore towards the vessel. The annular passage 70 formed within the outer hose 66 is utilized to receive the small amounts of vapor that bleed out of the inner hose. The walls of the outer hose 66 are constructed similarly to those of the inner hose, except that no bleeder carriers are utilized to increase the rate at which gas permeates through the rubber material of the outer tube into the surrounding water. The rate at which the gaseous molecules bleed through the outer hose 66 is much lower than that of the inner hose, so that the outer hose is substantially impermeable compared to the inner tube, although the small molecules of the petroleum gas can permeate through rubber.

Figure 3:
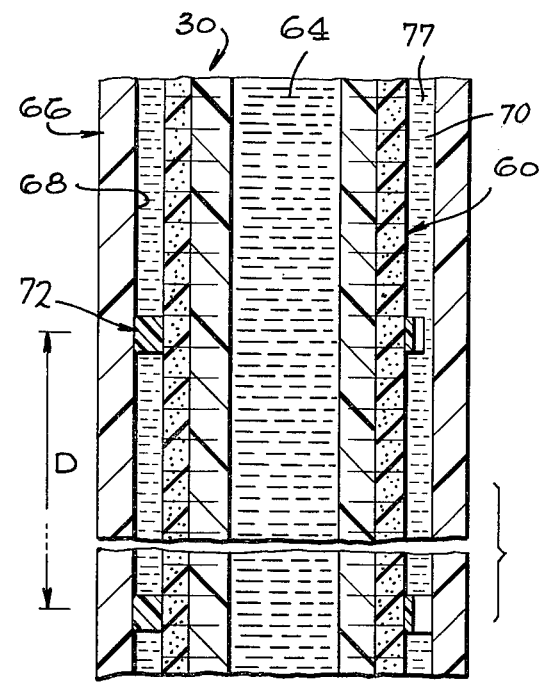
FIG. 3 is a sectional view of a hose structure of FIG. 1, as taken on the line 3—3 thereof.

FIG. 3 illustrates the underbuoy hose structure 30, which is similar to the floating one 28 except that the outer passage 70 of the underbuoy hose structure is filled with a liquid 77. An antifreeze liquid such as ethylene glycol can be used. The liquid 77 serves to increase the pressure within the annular passage 70 at increasing underwater depths, to account for the increasing pressure of the water at increasing depths. The pressure within the annular passage 70 near sea level can be at approximately atmospheric pressure (i.e. less than about 15 psi above atmospheric pressure) or even at a slight vacuum. Vapor permeating through the inner hose, can bubble up through the liquid 77. The vapor can be passed through the floating hose 28 (along with vapor gathered in the floating hose) to the vessel 18, where the vapor can be disposed of as by delivering it to pump 48 to flow along with vapor from the vessel tank 16 back to the shore installation for reliquification.

In one mode of operation, the LPG 64 is pumped at a pressure of 100 psi and a temperature of $-45°$ C. towards the vessel. The vapor in the outer passage 70 of the hose structure can be at a low pressure such as about atmospheric pressure in the floating hose 28. The outer hose serves not only to assure that vapor can continue to bleed out of the inner hose and to capture such vapor, but also to help prevent blow out of any weakened part of the inner hose by containing any bulge, and also to capture any LPG that might leak out of a ruptured part of the inner hose.

Figure 4:
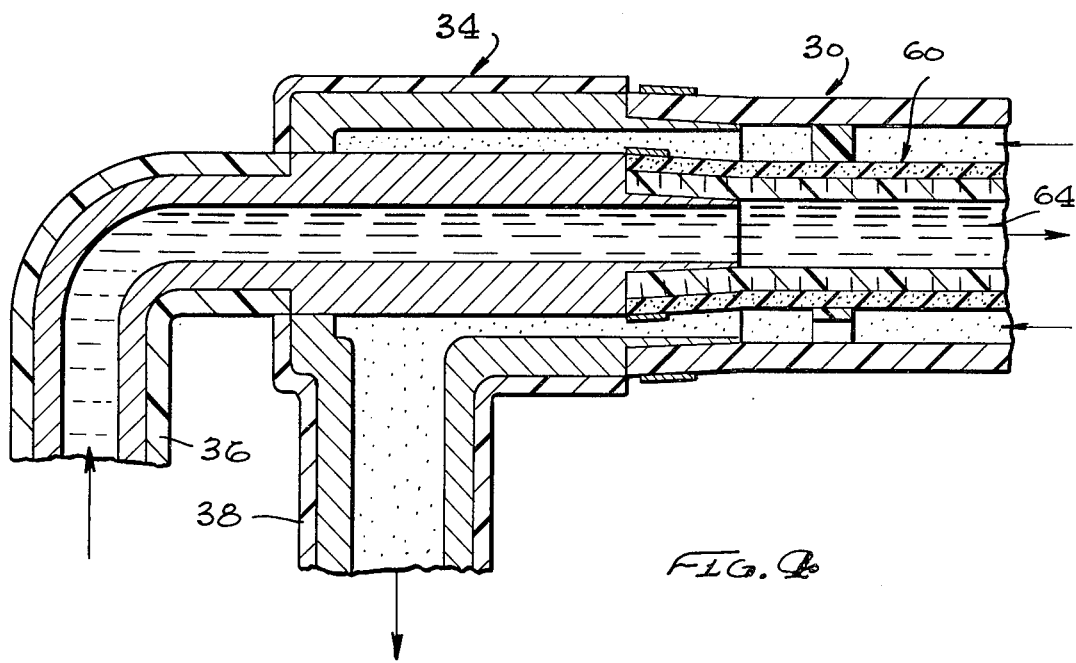
FIG. 4 is a sectional view of a coupling that can be utilized in another embodiment of the invention.

Instead of utilizing the annular passage 70 of the hose structure to carry primarily only vapor which has permeated through the inner hose that carries LPG, it is also possible to utilize the annular passage to carry larger amounts of vapor, from the insulated vessel tanks towards the shore. In that case, the additional hoses 49, 51 can be eliminated, and all vapor at a higher pressure such as 70 psi can be pumped from pump 48 into the annular passage of floating hose 28. A coupling 34, shown in detail in FIG. 4, located at the lower end of the underbuoy hose, can be used to couple the two-passage hose structure to the two pipes 36, 38.

Figure 5:
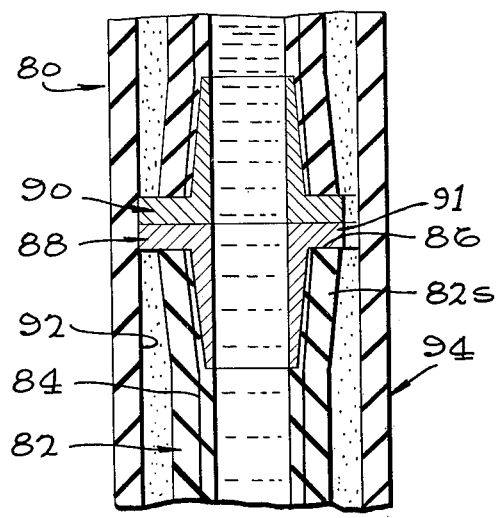
FIG. 5 is a sectional view taken along the axis of a hose structure of another embodiment of the invention.

FIG. 5 illustrates another hose structure 80 wherein the inner hose 82 includes a fabric layer 84 which lies in a hose body that contains wound strips of rubber and steel wire that are vulcanized together. The vapor arising from liquid droplets penetrating into the hose body move in the axial or length direction of the hose along the fabric layer 84. When the vapor reaches the end 86 of an inner hose section 82s where the end is held to a fitting 88 that joins to another fitting 90 to hold a pair of hose sections together, the vapor leaks outward between the hose end 86 and the flange 91 of the fitting, into an annular passage 92 formed between an outer hose 94 and the inner hose 82. The flanges 91 have slots therein to allow the movement of vapor along the annular passage.

Figure 6:
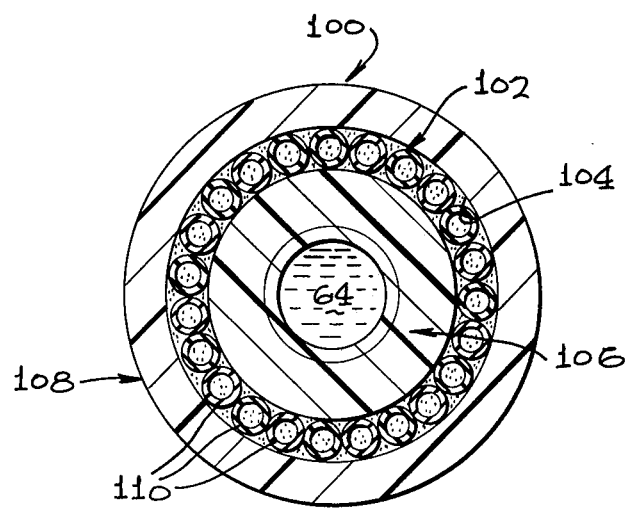
FIG. 6 is a cross sectional view of a hose structure of another embodiment of the invention.

FIG. 6 illustrates another hose structure 100 wherein the spacer structure 102 in the annular passage 104 between the vapor-bleedable inner hose 106 and the substantially impermeable outer hose 108 is in the form of multiple rubber tubes 110. Considerable amounts of gas can flow along the annular passage by moving between the tubes 110 and also through the tubes.

Thus, the invention provides an offshore liquified gas transfer system, which includes a hose structure which can lie in the water and transfer cooled liquified gas such as LPG. The hose structure is constructed with an inner hose forming a central passage for carrying LPG and an outer hose surrounding the inner hose and leaving an annular passage between them for carrying vapor. The inner hose is formed with permeable walls, such as with bleeder carriers formed of fabric, which permit the escape of pressured vapor from inside the walls which result from the evaporation of small droplets of LPG that migrate into the walls and which can rapidly vaporize especially when the inner hose no longer carries LPG. The outer hose whose inner surface is in contact with vapor rather than liquid, is substantially impermeable, in that it is devoid of bleed carriers which may be penetrated by water that later freezes to block the escape of vapor. Thus, the annular passage can be utilized to receive and carry away vapor bled from the inner hose to avoid the bleeding of such vapor directly into the surrounding water. The annular passage formed by the outer hose, also can be utilized to carry larger amounts of vapor that are pumped therethrough. The hose structure can be utilized in a transfer system wherein LPG from a liquification apparatus on the shore is pumped through undersea lines to a transfer structure from which it is carried to a vessel, and wherein the hose lies in the water. In such a system, the hose also can be utilized to carry vapor in its annular passage, which flows from the vessel back to the liquification plant on the shore, as to carry vapor generated in the LPG tanks on the vessel.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a system for transferring cooled liquified gas from a liquifier of a shore based installation to a ship which has a heat insulated tank for holding the liquid, by way of an offshore transfer structure which moors the ship, and wherein the conduit assembly which carries material between the ship and shore includes a flexible hose structure lying in the water, the improvement wherein:
    said flexible hose structure includes an inner hose forming a central passageway and having an inner hose periphery, and an outer hose surrounding said inner hose and having internal walls of much larger diameter than said inner hose periphery to leave an annular passageway between them; and including
    means coupling said central passageway to said liquifier, to carry cooled liquid gas towards said vessel; and
    means coupled to said annular passageway to carry away vapor lying therein.
2. The system described in claim 1 wherein:
    the walls of said inner hose are permeable to the bleeding out of pressured vapor arising from the vaporization of liquified gas which has permeated partially through the walls of said inner hose, but the walls of said outer hose are much less permeable to the passage of vapor therethrough than the walls of said inner hose.
3. The system described in claim 1 wherein:
    the pressure in said annular passage is maintained at a lower level than the pressure in said central passage, whereby to enable vapor migration into the annular passage from which the vapor can be easily recovered.
4. The system described in claim 1 wherein:
    said conduit assembly includes two separate substantially rigid pipes and a coupling which connects said central passageway to a first of said pipes and which connects said annular chamber to a second of said pipes.
5. The system described in claim 1 wherein:
    at least a portion of said flexible hose structure extends largely vertically under water, and said annular passage is filled with a liquid.
6. The system described in claim 5 wherein:
    said liquid is an inert antifreeze liquid.
7. The system described in claim 1 including:
    means for pumping vapor from said heat insulated tank on said vessel into said annular passage, and said shore based installation includes means coupling said annular passage to said liquifier.
8. A flexible hose assembly which can be used to carry cooled liquified gas while the hose assembly lies in water, comprising:
    an inner flexible hose forming a central passageway, the walls of said inner hose having bleed carrier means positioned to carry vapor from liquified gas lying in minute recesses of the inner hose walls and that has been heated, to the outside of said inner hose so that said vapor is not trapped in said inner hose walls to damage them; and
    an outer flexible hose having an inside diameter much greater than the outside of said inner hose so there is a space between them, said outer hose surrounding said inner hose and leaving an annular passageway between them to receive and carry away vapor, the walls of said outer hose having a much lower permeability to the passage of vapor therethrough than said inner hose walls.

9. A system which can be used to carry cooled liquified gas between a vessel and a shore-based installation through a hose assembly that lies in water, comprising:

an inner flexible hose forming a central passageway, the walls of said inner hose having bleed carrier means positioned to carry vapor from liquified gas lying in minute recesses of the inner hose walls and that has been heated, to the outside of said inner hose so that said vapor is not trapped in said inner hose walls to damage them;

an outer flexible hose having an inside diameter greater than the outside of said inner hose, said outer hose surrounding said inner hose and leaving an annular passageway between them to receive and carry away vapor, the walls of said outer hose having a much lower permeability to the passage of vapor therethrough than said inner hose walls;

a vessel having an insulated storage tank constructed to hold cooled liquified gas, said tank having a first coupling which can receive liquified gas and a second coupling which can discharge vapor;

a compressor having an inlet coupled to said tank coupling to receive vapor therefrom, and an outlet coupled to said annular passage of said hose assembly; and a shore based liquifier having an inlet coupled to said annular passage of said hose assembly and an outlet coupled to said central passage thereof to flow reliquified gas along with any other liquified gas to said tank.

10. A system which can be used to carry cooled liquified gas between a vessel and a shore-based installation through a hose assembly that lies in water, comprising:

an inner flexible hose forming a central passageway, the walls of said inner hose having bleed carrier means positioned to carry vapor from liquified gas lying in minute recesses of the inner hose walls and that has been heated, to the outside of said inner hose so that said vapor is not trapped in said inner hose walls to damage them;

an outer flexible hose having an inside diameter greater than the outside of said inner hose, said outer hose surrounding said inner hose and leaving an annular passageway between them to receive and carry away vapor, the walls of said outer hose having a much lower permeability to the passage of vapor therethrough than said inner hose walls; and a quantity of liquid of a much lower freezing temperature than seawater lying in said annular passageway, whereby to provide an internal pressure that increases with depth while permitting the passage of bubbles of vapor therethrough that have bled through the walls of said inner hose.

11. The assembly described in claim 10 wherein:
the pressure in said annular chamber at substantially sea level is approximately atmospheric pressure.

* * * * *